United States Patent Office 3,296,084
Patented Jan. 3, 1967

3,296,084
TEMPERATURE CONTROL OF GRAPHITE-MODERATED NUCLEAR REACTORS
Sydney Fawcett, Hale Barns, Richard Valentine Moore, Appleton, and Burton Cutts, Culcheth, Warrington, England, assignors to United Kingdom Atomic Energy Authority
Continuation of application Ser. No. 835,523, Aug. 24, 1959. This application Jan. 22, 1965, Ser. No. 427,303
Claims priority, application Great Britain, Sept. 4, 1958, 28,499/58
10 Claims. (Cl. 176—59)

This invention relates to nuclear reactors and is a continuation of our application Serial No. 835,523 filed August 24, 1959, now abandoned. The invention is concerned with temperature control of graphite moderated nuclear reactors.

A gas-cooled, natural or only slightly enriched uranium-fuelled graphite moderated reactor has a reactivity dependent upon the temperature of components in the reactor. Where reactivity increases with temperature increase the reactor is said to have positive reactivity coefficient (expressed in units of reactivity change per degree centigrade temperature change) and where it decreases with temperature, a negative reactivity coefficient. The positive coefficient represents a tendency to instability which is not necessarily serious in itself so long as its response time is long enough to allow control.

The fuel in the reactor has, considered on its own, a negative reactivity coefficient. When considered with graphite however, conditions can occur that give rise to overall positive coefficient. These conditions arise as the plutonium content of the fuel increase, plutonium having the property (in the temperature ranges being considered) of an increasing fission cross-section as neutron energies increase (i.e., as moderator temperatures increase). If the increased fission rate is left uncontrolled a further temperature increase in the graphite takes place after a short thermal time lag, and the fission rate is increased further. This temperature sensitive growth of fission rate can, of course, be arrested by the operator but it may be considered inadvisable or even impractical to burden the operator with the control of continuously changing factors of which that referred to above is only one.

It is, therefore, an object of the present invention to provide arrangements in a graphite moderated nuclear reactor removing or mitigating a positive reactivity coefficient.

According to the invention, a graphite moderated nuclear reactor has means for confining at least a portion of the coolant entering the reactor to passage through the graphite moderator prior to its contra-directional passage in contact with fuel elements orientated in channels in the moderator, thereby cooling the moderator to reduce the amount of its temperature variation and bring about reduction of the effects of positive moderator temperature coefficient.

Where only a portion of the coolant entering the reactor is employed for cooling the moderator, the remaining coolant may by-pass the moderator and in so doing be employed for cooling a vessel containing the moderator, before rejoining the moderator cooling portion for the said contra-directional flow in contact with fuel elements.

The coolant confined to passage through the moderator may be separated into two fractions, one fraction being constrained to flow along non-fuel-element passages in the moderator, and the other fraction being constrained to flow in contact with the moderator along an annular passage in each fuel element channel, which passage is separated from the passage for fuel element-contacting coolant in each channel. The two fractions may be combined for contra-directional flow together in contact with the fuel elements. Alternatively, the coolant may be divided into two fractions after having passed through the moderator and one fraction may be confined to flow along said annular passage whilst the other fraction is constrained to flow over the fuel elements.

The said annular passage in each fuel element channel may be outside sleeving means disposed between the fuel elements and the wall of the respective channel and spaced from the said wall to form an annulus.

In order to reduce heat degradation by heat transfer from the fuel elements to the moderator coolant fraction in the said annulus, a thermal barrier is preferably disposed between the fuel elements and the said sleeving means in each channel, whereby thermal insulation of said annular passage from said fuel elements and from coolant flowing thereover is provided.

The sleeving means preferably comprise graphite sleeves relatively thick so as to render them capable of being mechanically handled, since they will normally be a structural part of fuel element assemblies and be removed from the reactor and replaced by new assemblies on refuelling Each thermal barrier preferably comprises a further sleeve arranged to provide a static gas gap between the graphite sleeve and itself. Since the thermal barrier sleeves will not normally be handled on refuelling, they may each be thin and may be of graphite or of impervious temperature resistant material, for example zirconium metal.

The moderator is preferably a structure incorporating bricks of graphite and having longitudinal fuel element channels comprising a first group orientated therein, the non-fuel element passages in the moderator for the moderator coolant being provided by a second group of channels between adjacent longitudinal faces of the graphite bricks of the moderator structure. The second group of channels are preferably provided by crenellating said adjacent faces, or alternatively may be provided by chamfering the longitudinal corners of said adjacent faces.

A constructional example embodying the invention will now be described with reference to the accompanying drawings, wherein:

FIGURES 2, 3 and 4 are drawn to larger scales than that of FIGURE 1.

Figure 1:
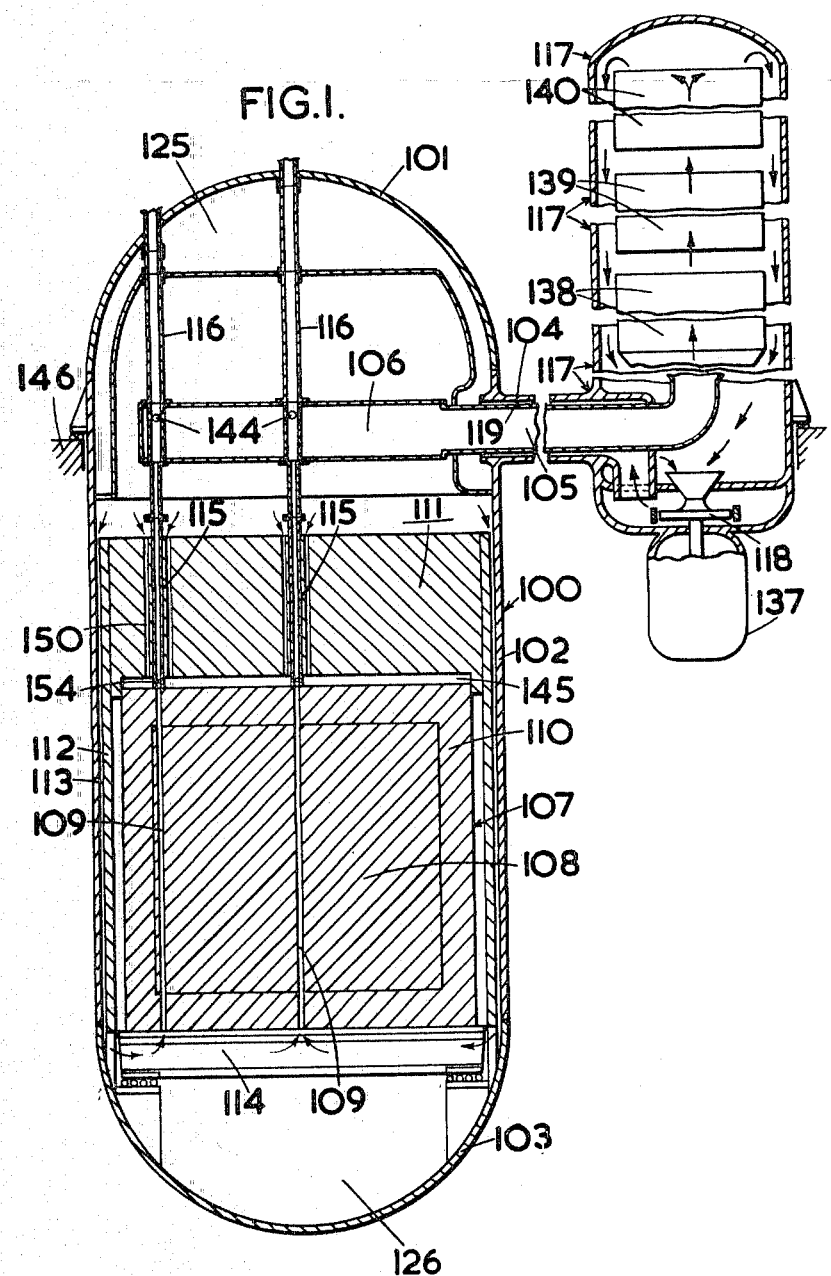
FIGURE 1 is a diagrammatic fragmentary side view in section.

Referring to FIGURE 1 of the drawings, there is illustrated diagrammatically a nuclear reactor having a pressure vessel 100 consisting of a top dome 101, having wall means defining an upper space 125, a generally cylindrical portion 102, and a bottom dome 103 having wall means defining a lower space 126. The vessel 100 contains a core consisting of a moderator 108 and graphite reflector 110 pierced by a first group of vertical channels 109 (two only of which are shown for the sake of clarity) the majority intended for fuel elements and the remainder for control rods, shut-off devices, flux scanning gear, graphite sampling equipment, etc. Above the core with clearance to leave a space 145 is disposed a neutron shield 111 pierced by channel extensions formed by tubes 115 aligned and communicating with the first group of channels 109, the tubes 115 communicating through apertures 144 with a hot box or header vessel 106 and with standpipes 116 which pierce the top dome 101 and serve for access to the first group of channels 109 for refuelling and other purposes and are normally sealed by shield plugs (not shown). The reflector 110 and neutron shield 111 are surrounded by a thermal shield 112 spaced from the cylindrical wall of the portion 102 of the pressure vessel to provide a passage 113 therebetween. Components 108, 110 and neutron shield 111 are supported by a diagrid 114 itself supported by brackets on the interior of the dome 103 of the pressure vessel, the load on the brackets being transferred through the shell of the pressure vessel to foundations 146.

Figure 2:
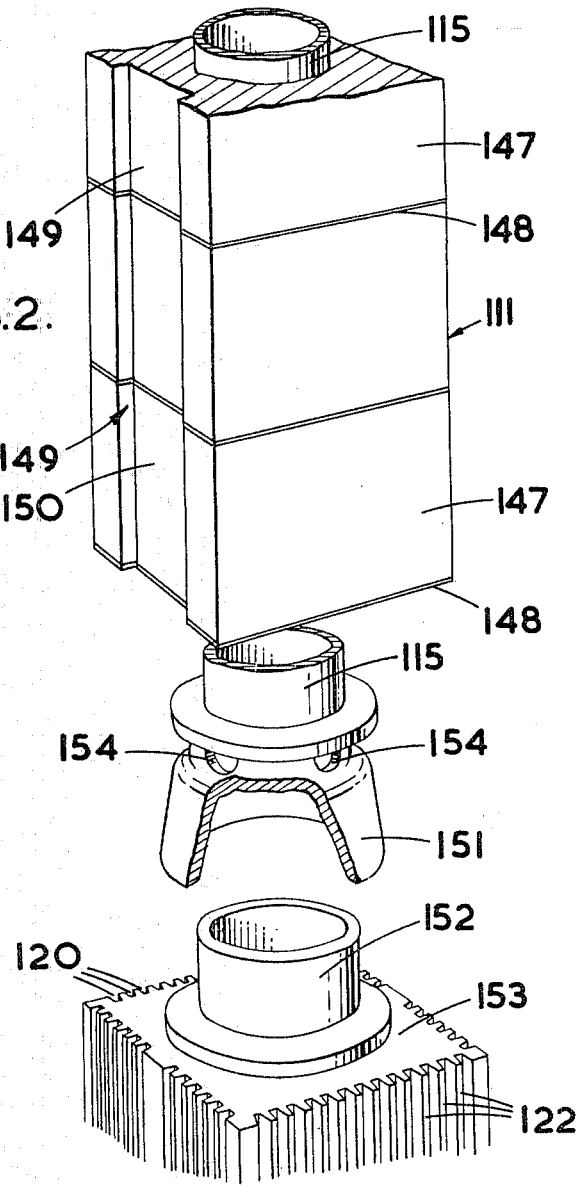
FIGURE 2 is a fragmentary perspective view.

The neutron shield is shown more particularly in FIGURE 2 and is formed from columns of graphite bricks 147 interlayered with boron plates 148, the tubes 115 penetrating the bricks 147 and plates 148 and the latter two components being provided with registering recesses 149 which when the bricks and plates are assembled to form the complete neutron shield 111 form a third group of channels or passages 150 extending from the top of the neutron shield 111 to the space 145 between the neutron shield 111 and the reflector 110 of the core. The columns forming the neutron shield 111 are each supported on a stool 151 engaging a spigot 152 supported by the top of a registering column of graphite bricks 153 which when assembled form the reflector 110 and moderator 108. The spigot 152 engages the channel 109 in the respective column of bricks 153. The stool 151 has apertures 154 which communicate between the spaces 145 and the channel 109.

Figure 3:
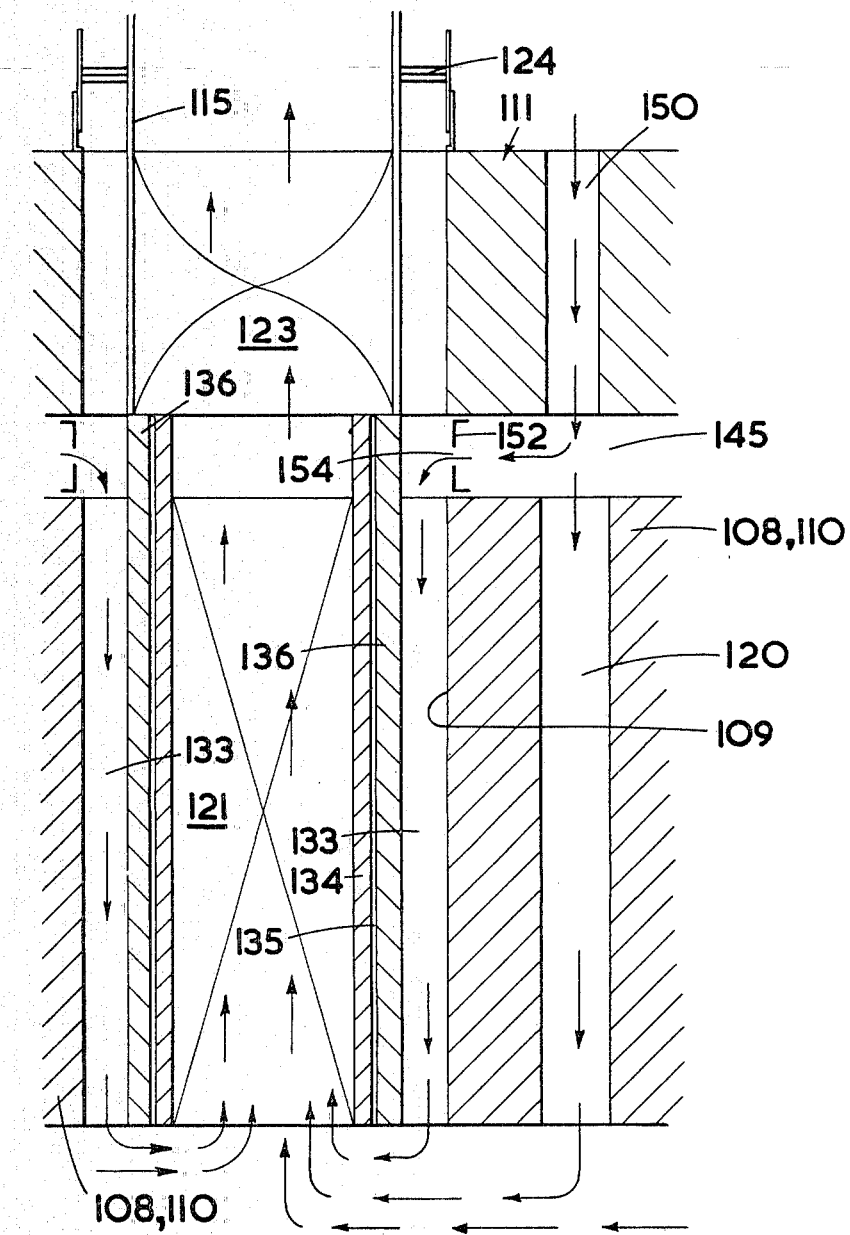
FIGURE 3 is a diagrammatic fragmentary side view in section.
Figure 4:
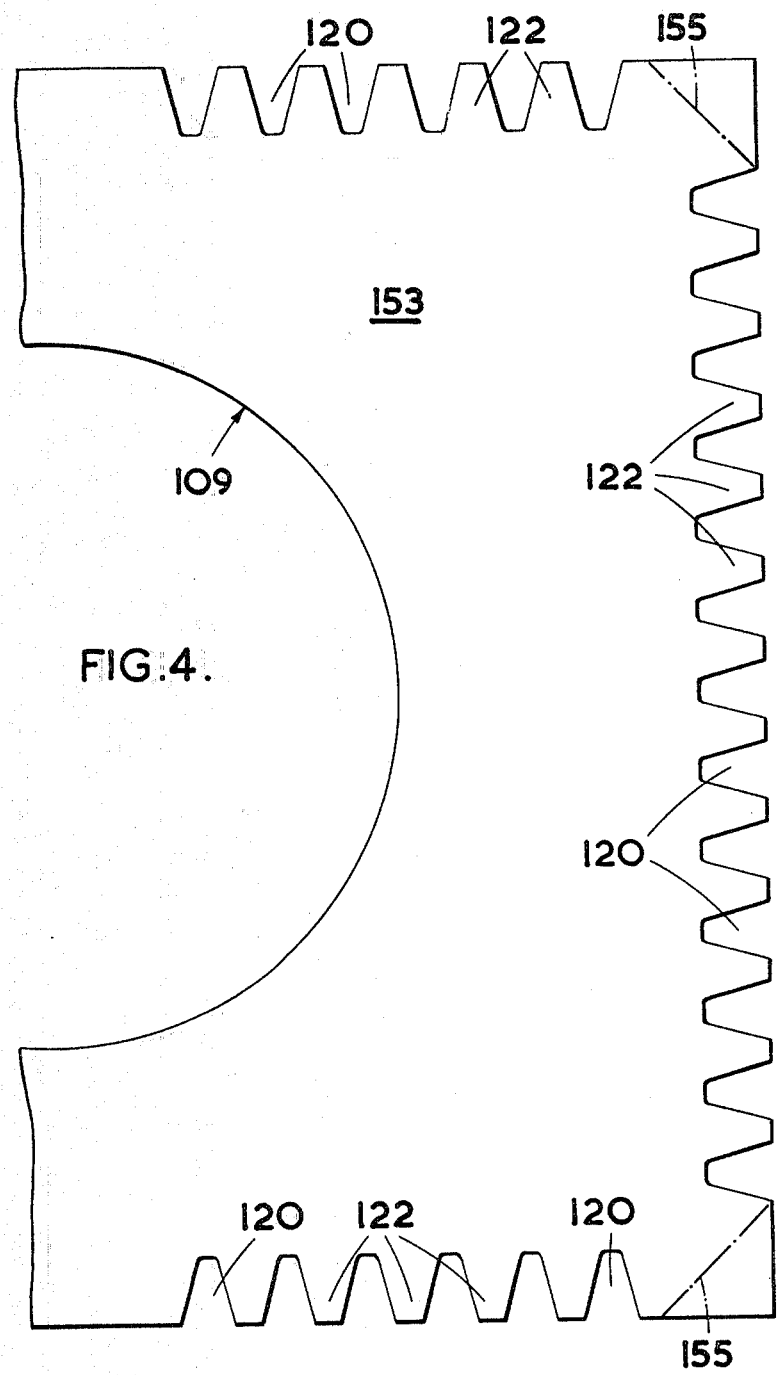
FIGURE 4 is a fragmentary plane view.

The header vessel 106 communicates via ducting 105 with one or more heat exchangers, one only being shown in FIGURE 1 for the sake of clarity and designated 117. A circulator 118 whose drive is contained in a housing 137 is disposed within the shell of the heat exchanger 117 at the bottom thereof and return ducting 104 coaxial with the ducting 105 and providing an annular passage 119 between the ducting 104, 105 communicates with the interior of the pressure vessel. Coolant (for example carbon dioxide) under pressure is circulated by the circulator 118 and flow takes place along the annular passage 119 between ducting 104 and 105, into the pressure vessel to cool the dome 101, then divides into two portions, one of which passes downwardly through the passage 113 to cool the thermal shield 112 and the wall of the pressure vessel portion 102. The other portion passes downwardly through the channels 150 in the neutron shield 111 to cool it and from thence to the space 145. Referring now to FIGURE 3, there is illustrated diagrammatically a core channel 109 and an assembly of fuel elements 121 disposed therein. Each fuel element 121 has a graphite sleeve 136 which is spaced from the wall of the channel 109 to provide an annular passage 133. Furthermore, there is a thermal insulating sleeve 134 disposed between the fuel members of the fuel element and the sleeve 136 so as to provide a static gas gap 135 which serves to reduce heat transfer from the fuel members and from coolant in heat transfer flow thereover, to the annular passage 133. Furthermore, the core has channels of a second group extending through it, one such channel being shown diagrammatically in FIGURE 3 and designated 120. The channels of the second group are conveniently formed in adjacent vertical faces in those graphite bricks 153 which are penetrated by the channels 109, by crenellations 122, as shown in FIGURES 2 and 4. The channels 120 formed between the bricks 153 present a large surface area of graphite to coolant flowing therethrough while keeping the cross-sectional area of the passages relatively small thereby economising in neutrons and avoiding the necessity for increased enrichment of the nuclear fuel contained in the fuel elements 121.

It will now be appreciated that the portion of coolant which enters the space 145 via the third group of channels 150 again divides into a portion which flows downwardly through the second group of channels 120 thereby cooling the moderator 108 and reflector 110, and a portion which flows downwardly through the annular passages 133, the latter portion serving partly to cool the moderator 108 and reflector 110 and partly to cool the graphite sleeves 136 which themselves have a moderating function and are main structural members of the fuel elements 121. These two portions combine below the bottom reflector 110 in the lower space 126 and also combine with the portion of coolant flowing down the annular passage 113 between the pressure vessel portion 102 and the thermal shield 112. The total combined coolant then passes upwardly through the fuel elements 121 in passages defined by the interior of the thermal insulation sleeve 134 and by heat transfer from the fuel members extracts nuclear heat. The combined coolant then passes upwardly through the channel extensions or tubes 115 into the header vessel 106, along the ducting 105 to the heat exchanger 117 wherein it flows upwardly successively through a superheater 138, an evaporator bank 139 and an economiser bank 140 whereby the heat in the coolant is exchanged to raise and superheat steam which can be employed in well-known manner to drive a turbo-generator (not shown) for producing electric power. The coolant after giving up its heat then flows downwardly in contact with the wall of the heat exchanger 117 to cool it, and thence to the circulator 118 for return to the reactor pressure vessel. It will be appreciated that the coolant flow takes place in a closed system as described.

A neutron shield plug 123, shown diagrammatically in FIGURE 3, is employed to scatter neutrons which escape up the tube 115 and cause them to be absorbed in the neutron shield 111. The shield plug 123 may be for example as disclosed in our U.S. application Ser. No. 821,493, filed June 19, 1959, now U.S. Patent No. 3,090,742. A gas seal 124 is employed to prevent coolant flow from the upper regions of the pressure vessel from passing between the tubes 115 and the channels therefor in the neutron shield 111.

The fuel elements for each channel 109 are preferably interconnected as a train. Each train is connected to a neutron shield plug 123 so that on discharge, removal is as a complete assembly. Each neutron shield plug 123 is preferably also connected by a distance piece to a seal plug for the respective standpipe 116, so that charge and discharge of fuel elements may be effected from the charge face (not shown, but situated at the top of the standpipes 116) without the necessity for employing a grab having to operate within the standpipes 116. The fuel elements may be for example as described in our U.S. application Ser. No. 787,430 filed January 19, 1959, now U.S. Patent No. 3,128,235.

It has been found that by employing the portion of the coolant flowing in the annular passage 113 and by-passing the second group of channels 120 and the passages 133 in the moderator 108 and reflector 110, the passages 133 and channels 120 can be made smaller than they would have to be to accept the whole coolant flow without an unacceptable pressure drop across the moderator and reflector, this resulting in neutron economy and avoiding loss in pumping power. On the other hand, even though the passages 133 and channels 120 can be made smaller by employing the crenellations 122 to form the channels 120 a comparatively large surface area of graphite is presented to the coolant for effective cooling of the moderator 108 and reflector 110. In a specific case, with an approximately equal division of coolant between on the one hand the passage 113 and on the other hand the channels 120 and passages 133, optimum moderator and reflector cooling, neutron economy and pumping power economy is effected.

The apertures 154 in the stools 151 form fixed gags for coolant flowing through the passages 133 and thereby determine the fraction flowing therethrough. It is desirable that the amount of coolant flowing in the passages 133 be restricted so that in the event of any fracture of sleeves 136 and 134 or any separation of these sleeves from adjacent sleeves in the train of fuel elements 121, the amount of coolant which can "short-circuit" and join the flow upwardly over the fuel members is limited and fuel members which are by-passed are not subjected to undue overheating.

In an alternative construction, the apertures 154 in the stools 151 and the gas seal 124 may be omitted and all the portion of coolant flowing down the channels 150 in the neutron shield 111 is then constrained to flow down the channels 120 in the moderator 108 and reflector 110. From thence, after combination with the portion flowing down the passage 113, the coolant flow is again divided, the major portion passing upwardly over the fuel members and the minor portion passing upwardly along the passages 133. The relative sizes of these portions are preferably adjusted automatically according to the outlet temperature of the coolant flowing over the fuel members and may be effected as described in our said application Ser. No. 821,493.

The coolant entering the reflector and moderator for downward flow therethrough is desirably in all cases at an initial temperature in excess of that necessary for overcoming (or reducing to within safe limits) Wigner energy problems.

Instead of adjacent vertical faces of the graphite bricks 153 being crenellated, adjacent vertical corners of the bricks 153 may be chamfered, as indicated by the dot-and-dash lines 155 in FIGURE 4, to provide the coolant passages through the core. This is, however, not as effective in presenting a large surface area of the graphite to the coolant as the embodiment hereinbefore described, but may be efficient enough for reactors in which the heat rating is not high and simplicity of design is called for.

We claim:

1. A graphite moderated nuclear reactor arrangement for reducing the effect of a positive moderator temperature coefficient comprising a graphite moderator structure defining a series of parallel-disposed channels extending right through said structure and divided into first and second groups with a channel of the first group disposed between adjacent channels of the other group and spaced from the channels of the other group by moderator material, a header vessel adjacent to and spaced from said structure and traversing the extending axes of said channels, reactor fuel in the channels of said first group only and means defining coolant paths around the fuel, channel extensions connecting the header vessel with the adjacent ends of the channels of the said first group only, means for feeding reactor coolant to the ends of the channels of the said second group adjacent the header vessel to flow through the channels of the second group, means restricting coolant from flowing into the ends of the fuel coolant paths nearest the header vessel, wall means extending transversely across the axes of said channels and arranged to constrain coolant emerging in bulk from the ends of the channels of said second group remote from said header vessel to enter the ends of the channels of said first group remote from the header vessel, and flow through the fuel coolant paths in the channels of the first group in contra-direction to the flow of the coolant in the channels of the second group, means defining a flow path from the fuel coolant paths to the interior of said header vessel, and means for withdrawing coolant from the interior of said header vessel.

2. A graphite moderated nuclear reactor arrangement for reducing the effect of a positive moderator temperature coefficient comprising a graphite moderator structure defining a first group of parallel-disposed channels extending right through the moderator structure, a header vessel adjacent to and spaced from said structure and traversing the extended axes of the channels of said first group, channel extensions connecting the adjacent ends of the channels of said first group with said header vessel, nuclear fuel in said channels and means defining a coolant path around the fuel, means defining a second group of parallel-disposed channels extending right through said structure each channel of said second group being disposed between adjacent channels of said first group and spaced therefrom by graphite moderator material, means for feeding reactor coolant to one end only of each of the channels of said second group to flow through the channels of the second group, means restricting coolant from flowing into the ends of the fuel coolant paths nearest the header vessel, wall means extending transversely across the axes of all of the channels and arranged to constrain coolant emerging in bulk from the other end of the channels of said second group to enter the ends of the channels of said first group remote from said header vessel to flow through the fuel coolant paths in the channels of the first group and through the channel extensions to the header vessel, and means for withdrawing coolant from the interior of said header vessel.

3. A graphite moderated nuclear reactor arrangement for reducing the effect of a positive moderator temperature coefficient comprising a pressure vessel, a graphite moderator structure disposed within the pressure vessel and defining a series of parallel-disposed channels extending right through said structure and divided into first and second groups with a channel of one group disposed between adjacent channels of the other and spaced therefrom by moderator material, a header vessel adjacent to and spaced from said structure and traversing the extended axes of said channels, reactor fuel in the channels of the first group only and means defining coolant paths around the reactor fuel, channel extensions connecting the header vessel with the adjacent channels of said first group only, a heat exchanger external the pressure vessel and having a coolant inlet and a coolant outlet, a first duct connecting said coolant outlet with the interior of the pressure vessel, a second duct connecting said coolant inlet with said header vessel, coolant circulating means causing a flow of reactor coolant to enter said pressure vessel by way of said first duct and to leave said header vessel by way of said second duct, first wall means constraining coolant entering said pressure vessel as aforesaid to enter the ends of the channels of said second group adjacent said header vessel to flow through the channels of the second group, means restricting coolant from flowing into the ends of the fuel coolant paths nearest the header vessel, second wall means extending transversely across the axes of said channels and arranged to constrain coolant emerging in bulk from the ends of the channels of said second group remote from said header vessel to enter the adjacent ends of the channels of said first group and to flow through the fuel coolant paths in the channels of the first group in contra-direction to the flow of the coolant in the channels of the second group, and means defining a flow of coolant from the channels of the first group to the header vessel.

4. A graphite moderated nuclear reactor arrangement for reducing the effect of a positive moderator temperature coefficient comprising a pressure vessel, a graphite moderator structure disposed within the pressure vessel and defining a first group of parallel-disposed channels extending right through the moderator structure, a header vessel adjacent to and spaced from said structure and traversing the extended axes of said channels, channel extensions connecting said header vessel with the adjacent ends of said channels, nuclear fuel in said channels and means defining coolant paths around the fuel, means defining a second group of parallel-disposed channels extending right through said structure, each channel of said second group being disposed between adjacent channels of said first group and spaced therefrom by moderator material, a heat exchanger external the pressure vessel and having a coolant inlet and a coolant outlet, a first duct penetrating said pressure vessel in the region of one end only of the channels of said second group and connecting the interior of said pressure vessel with said coolant outlet, a second duct connecting said coolant inlet with said header vessel, coolant circulating means causing a flow of reactor coolant to enter said pressure vessel by way of said first duct and to leave said header vessel by way of said second duct, first wall means constraining coolant entering said pressure vessel as aforesaid to enter the adjacent ends of the channels of said second group to flow through the channels of the second group, means constraining coolant from flowing into the ends of the fuel coolant paths nearest the header vessel, second wall means extending transversely across the axes of said channels and arranged to constrain coolant emerging in bulk from the other ends of the channels of said second group to enter the adjacent ends of the channels of the first group to flow through the coolant paths in the channels of the first group in contra-direction to the flow of the coolant in the channels of the second group, and means defining a coolant flow from the channels of the first group through the channel extensions to the header vessel.

5. A nuclear reactor comprising a pressure vessel, an upright-disposed moderator structure contained within the pressure vessel and defining upper and lower spaces therewith, means defining a series of vertically-orientated channels extending through said structure and divided into first and second groups wtih each channel of one group disposed between adjacent channels of the other, a thermal shield enclosing the sides of the moderator structure to define an annular void with the shell of the pressure vessel and to connect said upper and lower spaces, a header vessel disposed in said upper space, channel extensions connecting said header vessel with the upper ends of the channels of said first group, nuclear fuel in the channels of said first group only, a heat exchanger external the pressure vessel and having a coolant inlet and a coolant outlet, a first duct connecting said upper space with said coolant outlet, a second duct connecting said header vessel with said coolant inlet and coolant circulating means causing a flow of reactor coolant to enter said pressure vessel by way of said first duct and to leave said pressure vessel by way of said second duct.

6. A graphite moderated nuclear reactor arrangement for reducing the effect of a positive moderate temperature coefficient comprising a pressure vessel, an upright-disposed graphite moderator structure contained within the pressure vessel and defining upper and lower spaces therewith, means defining a series of vertically-orientated channels extending right through said structure and divided into first and second groups with each channel of one group disposed between adjacent channels of the other and spaced therefrom by moderator material, a thermal shield enclosing the sides of the moderator structure to define an annular void with the shell of the pressure vessel and to connect said upper and lower spaces, a header vessel disposed in said upper space, channel extensions connecting said header vessel with the upper ends of the channels of said first group, nuclear fuel in the channels of said first group only and means defining coolant paths around said nuclear fuel, a heat exchanger external the pressure vessel and having a coolant inlet and a coolant outlet, a first duct connecting said upper space with said coolant outlet, a second duct connecting said header vessel with said coolant inlet, coolant circulating means causing a flow of reactor coolant to enter said pressure vessel by way of said first duct and to leave said pressure vessel by way of said second duct, wall means constraining fluid to flow from the header vessel into the adjacent ends of the channels of the second group to flow therethrough, means restricting the coolant from flowing into the ends of the fuel coolant paths nearest the header vessel, and additional wall means constraining coolant emerging from the other ends of the channels of the second group to enter the ends of the channels of the first group remote from the header vessel and flow through the fuel coolant paths in the channels of the first group in contra-direction to the flow of the coolant in the channels of the second group, the channel extensions defining a coolant flow path from the channels of the first group to the header vessel.

7. A graphite moderated nuclear reactor arrangement for reducing the effect of a positive moderator temperature coefficient comprising a pressure vessel, an upright-disposed graphite moderator structure contained within the pressure vessel and defining upper and lower spaces therewith, means defining a series of vertically-orientated channels extending right through said structure and divided into first and second groups with each channel of one group disposed between adjacent channels of the other and spaced therefrom by moderator material, a thermal shield enclosing the sides of the moderator structure to define an annular void with the shell of the pressure vessel and to connect said upper and lower spaces, a header vessel disposed in said upper space, channel extensions connecting said header vessel with the upper ends of the channels of said first group, nuclear fuel in the channels of said first group only and means defining coolant paths around said nuclear fuel, a heat exchanger external the pressure vessel and having a coolant inlet and a coolant outlet, a first duct connecting said upper space with said coolant outlet, a second duct disposed coaxially within said first duct and connecting said header vessel with said coolant inlet, coolant circulating means causing a flow of reactor coolant to enter said pressure vessel by way of said first duct and to leave said pressure vessel by way of said second duct, wall means constraining ffuid to flow from the header vessel into the adjacent ends of the channels of the second group to flow therethrough, means restricting the coolant from flowing into the ends of the fuel coolant paths nearest the header vessel, and additional wall means constraining coolant emerging from the other ends of the channels of the second group to enter the ends of the channels of the first group remote from the header vessel and flow through the fuel coolant paths in the channels of the first group in contra-direction to the flow of the coolant in the channels of the second group, the channel extensions defining a coolant flow path from the channels of the first group to the header vessel.

8. A graphite moderated nuclear reactor arrangement for reducing the effect of a positive moderate temperature coefficient comprising a graphite moderate structure composed of close-packed blocks of solid moderate material and defining a first group of parallel-disposed channels extending right through the moderate structure, each block having a central passage defining part of one of the channels of said first group, a header vessel adjacent to and spaced from said structure and traversing the extended axes of the channels of said first group, channel extensions connecting the adjacent ends of the channels of the first group with said header vessel, nuclear fuel in said channels and means defining a coolant path around the fuel, means defining a second group of parallel-disposed channels extending right through said structure, each of said blocks defining at least one side face having a recess defining part of one of the channels of the second group, each channel of said second group being disposed between adjacent channels of said first group and spaced therefrom by graphite moderate material, means for feeding reactor coolant to one end only of each of the channels of the second group to flow through the channels of the second group, means restricting coolant from flowing into the ends of the fuel coolant paths nearest the header vessel, wall means extending transversely across the axes of all of the channels and arranged to constrain coolant emerging in bulk from the other end of the channels of said second group to enter the ends of the channels of said first group remote from said header vessel to flow through the fuel coolant paths in the channels of the first group and through the channel extensions to the header vessel, and means for withdrawing coolant from the interior of said header vessel.

9. A graphite moderated nuclear reactor arrangement for reducing the effect of a positive moderative temperature coefficient comprising a graphite moderate structure defining a first group of parallel-disposed channels extending right through the moderate structure, a header vessel adjacent to and spaced from said structure and traversing the extended axes of the channels of said first group, channel extensions connecting the adjacent ends of the channels of the first group with said header vessel, nuclear reactor fuel in said channels and means defining a coolant path around the fuel, the fuel coolant path defining means comprising a sleeve member of solid moderator material in each channel enclosing the nuclear fuel and defining an annular passage with the wall of said channel so as to divide flow through said channel into a fuel coolant stream and a moderator coolant stream and insulating means for impeding transfer of heat between the two streams, means defining a second group of parallel-disposed channels extending right through said structure, each channel of said second group being disposed between adjacent channels of said first group and spaced therefrom by graphite moderator material, means for feeding reactor coolant to one end only of each of the channels of said second group to flow through the channels of the second group, means restricting coolant from flowing into the ends of the fuel coolant paths nearest the header vessel, wall means extending transversely across the axes of all of the channels and arranged to constrain coolant emerging in bulk from the other end of the channels of said first group to enter the ends of the channels of the second group remote from said header vessel to flow through the fuel coolant paths as coolant streams in the channels of the first group and through the channel extensions to the header vessel, and means for withdrawing coolant from the interior of said header vessel.

10. A nuclear reactor as claimed in claim 7 and provided with a neutron shield structure disposed between said moderator structure and said header vessel, said neutron shield structure being penetrated by said channel extensions and also being penetrated by a third group of channels defining a plurality of flow paths for coolant flowing from said upper space to the channels of said second group.

References Cited by the Examiner
UNITED STATES PATENTS

| | | | |
|---|---|---|---|
| 2,774,730 | 12/1956 | Young | 176—58 |
| 2,780,596 | 2/1957 | Anderson | 176—58 |
| 3,090,742 | 5/1963 | Fawcett | 176—59 |

OTHER REFERENCES

Proceedings of First Geneva Conference on Peaceful Uses of Atomic Energy, 1955, published by U.N., vol. 2, pages 342–347.

L. DEWAYNE RUTLEDGE, *Primary Examiner.*